US012755235B2

(12) United States Patent
Henry, Jr. et al.

(10) Patent No.: US 12,755,235 B2
(45) Date of Patent: Oct. 6, 2026

(54) CONSUMER INVENTORY MANAGEMENT SYSTEM AND METHODS THEREOF

(71) Applicant: SCHNUCK MARKETS, INC., St. Louis, MO (US)

(72) Inventors: Thomas E. Henry, Jr., Wildwood, MO (US); Yujin Lee, Maryland Heights, MO (US); Yao Xie, Chesterfield, MO (US); Adrian Salazar, Overland, MO (US); Kim Anderson, St. Louis, MO (US); Sue Mosbacher, Ballwin, MO (US); David Steck, Ballwin, MO (US); Robert Hardester, Olivette, MO (US); Caleb Hoelscher, Edwardsville, IL (US)

(73) Assignee: SCHNUCK MARKETS, INC., St. Louis, MO (US)

( * ) Notice: Subject to any disclaimer, the term of this patent is extended or adjusted under 35 U.S.C. 154(b) by 268 days.

(21) Appl. No.: 17/961,261

(22) Filed: Oct. 6, 2022

(65) Prior Publication Data

US 2023/0142203 A1 May 11, 2023

Related U.S. Application Data

(60) Provisional application No. 63/277,821, filed on Nov. 10, 2021.

(51) Int. Cl.
*G06Q 10/087* (2023.01)

(52) U.S. Cl.
CPC .................................. *G06Q 10/087* (2013.01)

(58) Field of Classification Search
CPC .. G06Q 10/087; G06Q 10/08; G06Q 10/0875; G06Q 20/3278; G06Q 20/3274; G06Q 10/00; G06Q 20/203; G06Q 20/387; G06Q 10/06; G06Q 30/02; G06Q 30/0201; G06Q 30/0202; G06Q 30/06; G06Q 40/03; G06Q 40/04; G06Q 40/06; G06Q 40/08; G06Q 30/0223; G06Q 30/0242; G06Q 30/0243; G06Q 30/0244; G06Q 30/0254; G06Q 30/0269; G06Q 30/0276; G11B 20/00195; H04M 3/42119; H04M 2250/04; Y10S 439/955; Y10S 902/04; Y10S 707/949; G03G 21/1657; G06K 19/045; G06K 19/145; G06K 17/00; G06K 19/07767; G06K 7/0008; G06K 7/10079;

(Continued)

(56) References Cited

U.S. PATENT DOCUMENTS 6,151,582 A * 11/2000 Huang ............. G06Q 10/06315
705/7.31
2009/0059270 A1 * 3/2009 Opalach ................. G06V 20/64
358/1.15

(Continued)

*Primary Examiner* — Avia Salman
(74) *Attorney, Agent, or Firm* — BARNES & THORNBURG LLP

(57) ABSTRACT

Devices, systems, and methods for managing inventory can include an inventory management system obtaining a gap-on-shelf status. The inventory management control system can determine an out-on-shelf profile based on the gap-on-shelf status, and can determine a response register based on the out-on-shelf status. The response register can include prioritized store-level actionable features for user access to conduct inventory management activities.

16 Claims, 4 Drawing Sheets

(58) Field of Classification Search
CPC ........... G06K 7/10178; G06K 7/10316; G06K 7/10336; G06K 7/10346; G06K 7/10356; G09F 3/0335; H01H 2300/032; H01Q 1/2208; H04B 5/0062; H04K 2203/20; H04Q 1/138; H04Q 2209/47; H04W 12/009; H04W 4/008; H04W 4/80; G06F 19/323; G06F 2212/178; G06F 18/23; G07G 1/0045; G07G 1/009; G16H 10/65; G08B 13/2474; Y02P 90/845; Y04S 10/56
USPC ............................................................ 705/28
See application file for complete search history.

(56) References Cited

U.S. PATENT DOCUMENTS

| | | | | |
|---|---|---|---|---|
| 2015/0262116 | A1 | 9/2015 | Katircioglu et al. | |
| 2016/0247108 | A1* | 8/2016 | Acuna | G06Q 30/0635 |
| 2016/0350787 | A1* | 12/2016 | Taylor | G06Q 10/087 |
| 2020/0118063 | A1* | 4/2020 | Fu | G06F 15/76 |
| 2021/0174291 | A1* | 6/2021 | Kim | G06Q 30/0635 |
| 2021/0237276 | A1 | 8/2021 | Shah et al. | |
| 2022/0036290 | A1* | 2/2022 | Quintero | G06F 16/29 |

* cited by examiner

Probability of OOS

| Item | Store | Probability of OOS |
|---|---|---|
| Halo Mandarines | 101 | 0.99 |
| Turkey Hill Ice Cream | 227 | 0.95 |
| Schnucks Buns | 272 | 0.88 |
| Doritos | 198 | 0.87 |
| Powerade | 136 | 0.86 |

CONSUMER INVENTORY MANAGEMENT SYSTEM AND METHODS THEREOF

CROSS-REFERENCE

This utility application claims the benefit of priority to U.S. provisional patent application No. 63/277,821, filed on Nov. 10, 2021, entitled "CONSUMER INVENTORY MANAGEMENT SYSTEM AND METHODS THEREOF," the contents of which is hereby incorporated by reference herein in their entirety.

TECHNICAL FIELD

The present disclosure relates to devices, systems, and methods in the field of inventory management. More particularly, the present disclosure relates to devices, systems, and methods in the field of consumer inventory management.

BACKGROUND

Consumer inventory management can present complex issues of time, information, space, and/or location. For large consumer-facing stores, rapidly and/or continually changing inventory stock, conditions, and/or support can present a revolving concern in order to properly serve consumers. Within the multitude of factors contributing to consumer inventory challenges, if inventory items are unavailable, or poorly (e.g., incompletely) available, to consumers within the store, the potential sales opportunities can be reduced. These missed opportunities can grow exponentially and/or lead to poor consideration of inventory for a given store. Moreover, appropriate actions to remedy inventory shortcomings can strain available resources, particularly when encountering wastefulness in time, resources, or otherwise.

SUMMARY

According to an aspect of the present disclosure, a consumer inventory system for managing inventory at the consumer level may comprise a visual image system comprising a camera system for capturing visual image data of consumer shelf inventory for determining gap-on-shelf status of inventory; and an inventory management control system including at least one processor for executing instructions stored on memory to determine an out-on-shelf profile based on the gap-on-shelf status of inventory and a store inventory operations analysis, the inventory management control system configured to determine a store response register based on the out-on-shelf profile. The store inventory operations analysis may include one or more of longitudinal transaction data, abnormality identification, and market value quantification concerning inventory.

According to another aspect of the present disclosure, a method of consumer inventory management may comprise obtaining a gap-on-shelf status, determining an out-on-shelf profile based on the gap-on-shelf status, and determining a response register based on the out-on-shelf profile, and displaying the response register to a user for prioritizing actionable features. In some embodiments, the response register may include a store response register comprising actionable features for store level execution. The store response register may be determined based on a supply chain profile.

In some embodiments, the supply chain profile may include at least one of warehouse data concerning timing and/or availability of inventory in remote warehouse supply, transportation data concerning timing, and/or availability of inventory in transit. The store response register may be determined based on a store level profile. The store level profile may include at least one of availability from featured display, availability from backroom, perpetual inventory quantity, and/or shelf condition. In some embodiments, determining a response register may further comprise prioritizing the response register based on one or more of ("Women, Infants, Children", WIC program) WIC status, in-Ad status, key value item status, and market value.

According to another aspect of the present disclosure, a consumer inventory system for managing inventory at the consumer level may comprise a visual image system comprising a camera system for capturing visual image data of consumer shelf inventory for determining gap-on-shelf status of inventory; and an inventory management control system including at least one processor for executing instructions stored on memory to determine an out-on-shelf profile based on the gap-on-shelf status of inventory and a store inventory operations analysis, the inventory management control system configured to determine a store response register based on the out-on-shelf profile. The store inventory operations analysis may include one or more of longitudinal transaction data, abnormality identification, and market value quantification concerning inventory.

In some embodiments, the inventory management system may be configured to determine the store response register based on a supply chain profile. The supply chain profile may include at least one of warehouse data concerning timing and/or availability of inventory in remote warehouse supply, transportation data concerning timing, and/or availability of inventory in transit.

In some embodiments, the store response register may comprise store level actionable entries isolated from supply-chain level actionable entries. Store level actionable entries may include restocking activities actionable at the store level to replenish one or more inventory items out-on-shelf based on the out-on-shelf profile. Such store level actionable inventory items may be determined based on one or more of a predetermined time to execution, [whether relevant inventory items are within store local inventory/possession, a threshold degree of successful restocking under current inventory status. Store level actionable entries may include restocking activities actionable at the store level including replenishing one or more inventory items out-on-shelf based on the out-on-shelf profile which inventory items are available within a local storage room, without the need for delivery of shipment to the store from remote warehousing.

In some embodiments, supply-chain level actionable entries may include restocking activities requiring action at the supply-chain level to replenish one or more inventory items out-on-shelf based on the out-on-shelf profile. Supply-chain level actionable entries may include restocking activities requiring delivery of shipment to the store in order to fulfill replenishment of one or more inventory items out-on-shelf. In some embodiments, market value quantification may comprise quantification based on predetermined governing rules of assessment and based on out-on-shelf hours assessment. Longitudinal transaction data may include transactional sales data based on one or more of identification of actively offered inventory, recorded transactional sales, and synthetic sales.

In some embodiments, synthetic sales may be determined based on teammate actions. The abnormality identification may be determined based on ranking of transactions according to time and a time gap since a last transaction concerning an inventory item. The abnormality identification may include determination of extreme out-on-shelf time status for an inventory item.

In some embodiments, the store response register may comprise a prioritization of items for imminent restocking at the store level. The out-on-shelf profile may include a determination of items for sale unstocked on consumer inventory shelves based on the gap-on-shelf status and the inventory movement analysis. The determination of items for sale unstocked on consumer inventory shelves may include a prediction of consumer inventory items which exist on consumer inventory shelves with high likelihood of being unstocked on shelves within a threshold time period.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
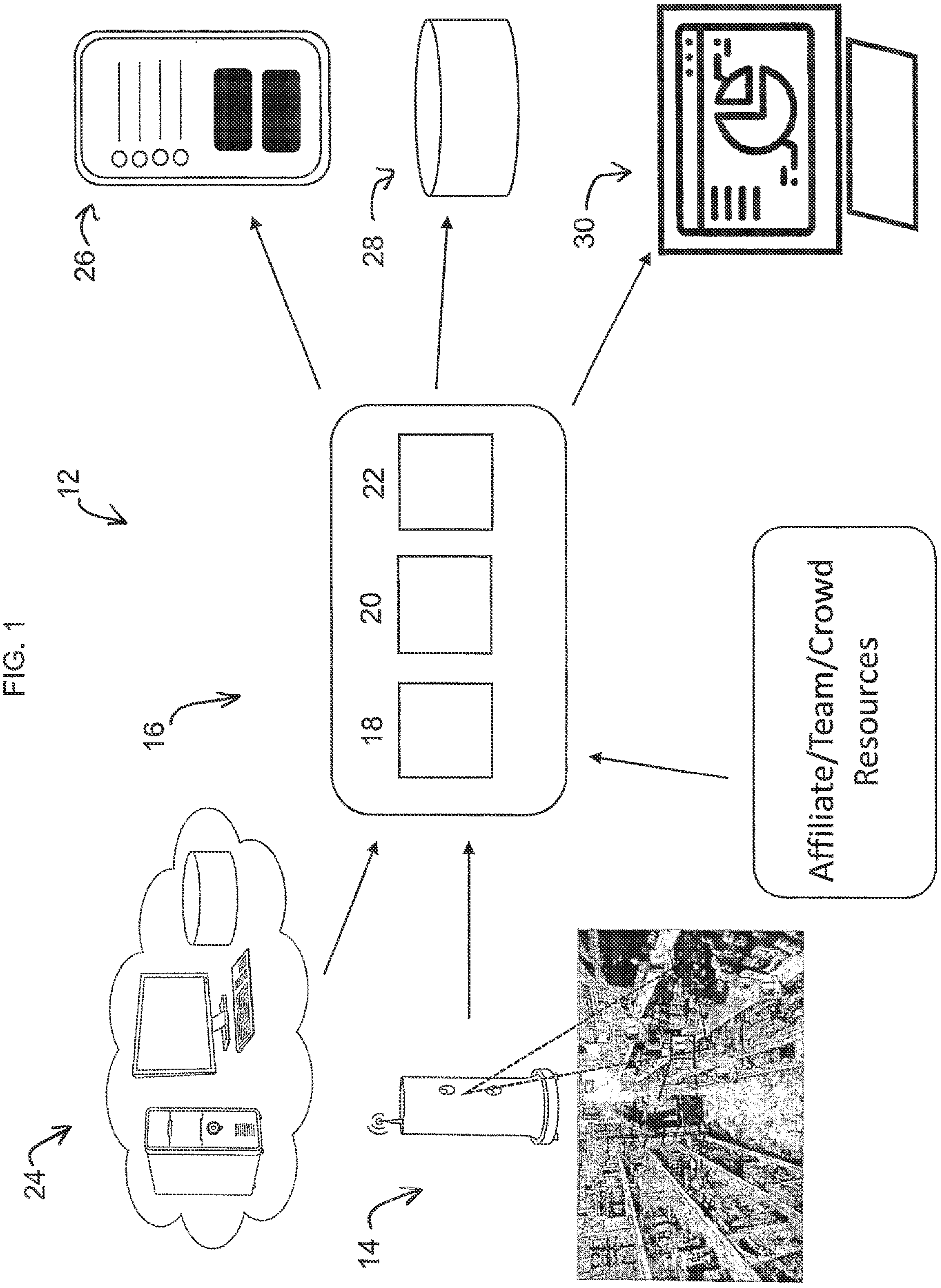
FIG. 1 is a diagrammatic view of a consumer inventory management system according to aspects of the present disclosure.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Consumer-facing inventory stores, such as grocery stores, and/or large box retail stores, generally offer goods (inventory) by presentation on consumer inventory shelves. Consumer inventory shelves need not require actual shelfing, but simply can refer to the area of organized presentation of inventory for the consumer to access. Such access may typically manifest in the consumer physically taking the item from the area, but may also include the customer merely seeing and selecting the item which store personnel may transport for the consumer's convenience. Regardless, issues of inventory management can be implicated.

When inventory items are removed from shelves, gaps or holes are created on the shelf, also known as out-on-shelf condition for a particular item. Leaving gaps or holes on shelves where inventory items are low or out can negatively affect sales where the consumer believes none of the particular inventory item is available. Moreover, such gaps can negatively affect the consumer's opinion of the store itself, store brand, class of item, and/or, brand of item. Large stores having many thousands of products consistently face challenges of restocking out-on-shelf conditions. Continuing the common example of store shelves from which the consumer physically takes away an item of inventory for purchase, these out-on-shelf conditions can be particularly problematic because there is no required action by the store (or store personnel) in order for the item to be taken by the consumer.

Yet, despite these challenges, store personnel can only manage a finite number of out-on-shelf conditions at once. More specifically, identifying and managing priority for out-on-shelf conditions can be a complex task with many pitfalls. Among traditional solutions, manual tracking out-on-shelf conditions itself can be overwhelming or unworkable. Automation has been proposed to assist in identifying out-on-shelf conditions but can be limited to its capacity for such identification. Visual image recognition may be applied to identify gaps on consumer shelves, for example, as discussed within U.S. Patent Application Publication No. 2015/0262116, titled "MACHINE VISION TECHNOLOGY FOR SHELF INVENTORY MANAGEMENT," published Sep. 17, 2015, the contents of which are incorporated herein by reference in their entirety. However, reliance on visual information can lead to incomplete information concerning the determination of out-on-shelf, and/or may not fully consider the balance of considerations in order to preferably manage actively revolving out-on-shelf conditions in a large store environment. Indeed, incorrect out-on-shelf determinations can lead to waste of resources and/or confusion in coordinating personnel and/or resources.

Additionally, available data concerning inventory can itself be challenging to handle. For example, rapidly changing and immense volumes of inventory data, such as transaction information and/or logistic information, can be overwhelming and/or can present challenges to useful and/or meaningful assessment of such information, let alone to distilling down data into actionable tasks for completion at the store level and/or supply-chain level. However, consideration of inventory information can assist in improved handling of inventory issues, such as out-on-shelf conditions. An exemplary inventory management system 12 is shown in FIG. 1. The inventory management system 12 is illustratively formed as a consumer inventory system for managing inventory at the consumer level, such as inventory on consumer inventory shelves for access by the consumer to the items of inventory. The inventory management system 12 illustratively includes a visual image system 14 for capturing visual information of the consumer shelf inventory to determine where gaps exist. The visual image system 14 illustratively includes a camera for capturing images, and is illustratively embodied as a robotic system for automated store reconnaissance, a suitable example of such a robotic system being discussed within U.S. Patent Application Publication No. 2015/0262116. As discussed in additional detail herein, inventory movement information can be used in conjunction with the visual image system 14 to manage inventory.

The inventory management system 12 illustratively includes an inventory management control system 16 for determining an out-on-shelf profile of the store. The inventory management control system 16 illustratively includes a processor 18 for executing instructions stored on memory 20, and communications circuitry 22 for communicating signals to and/or from the inventory management control system 16 based on commands of the processor 18 for conducting inventory management control system 16 operations. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry 22 can include components for facilitating processor operations, for example, suitable components may include transmitters, receivers, modulators, demodulators, filters, modems, analog/digital (AD or DA) converters, diodes, switches, operational amplifiers, and/or integrated circuits.

The inventory management control system 16 receives information regarding active inventory and determines an out-on-shelf profile based on the received information. In the illustrative embodiment, the inventory management control system 16 illustratively receives a gap-on-shelf status of inventory from the visual image system 14 which is determined as a predominantly visual gap based on the visual image data capture by the system 14. In some embodiments, the inventory management control system 16 may additionally receive the visual image data from the visual image system 14 and/or may itself determine the gap-on-shelf status based on the visual image data.

The inventory management control system 16 illustratively receives store level inventory operations data. Such store level inventory operations data is illustratively provided from a store database system 24 which may include servers, user access terminals, and/or other database devices and/or systems, and may or may not be networked with other systems local or remote. As discussed in additional detail herein, store level inventory operations data illustratively includes longitudinal transaction data such as sales velocity, abnormality identification, and market value quantification. Such store level inventory operations data may include statistical analysis of such data sources to provide refinement to the gap-on-shelf status of the visual image system 14. Such store inventory operations analysis may be applied as part of the gap-on-shelf status provided to the inventory management control system 16, and/or may be provided separately and applied by the inventory management control system 16.

The inventory management control system 16 illustratively determines an out-on-shelf profile based on the gap-on-shelf status of inventory. The out-on-shelf profile is a data-informed profile of out-on-shelf status of a particular item of inventory, but in some embodiments may include a data-informed profile of out-on-shelf status of several or all items of inventory for a store. The inventory management control system 16 determines the out-on-shelf profile based a supply chain profile.

In the illustrative embodiment, the supply chain profile includes indication of various supply-chain level factors. In the illustrative embodiment, the inventory management control system 16 determines the supply chain profile based on supply chain data concerning supply chain level status information. The inventory management control system 16 illustratively receives supply chain data from one or more of supply chain level databases, transport agents, manufacturing agents, and/or similarly situated parties providing logistics services above the store level. Such services are generally those logistics required to place inventory into the control of the store, and the timelines (e.g., wait times, shipping times) and specific logistics (manner or ordering, shipping, contractual provisions for reordering), can vary considerably depending on the inventory item. For example, routine domestic bulk and/or fresh items (e.g., standard milk, eggs) may have very short lead times, and/or may arrive direct from the producers, while artisan, unique, highly-regulated, and/or seasonal products may require various handlers and/or have variable lead times. It can be appreciated that such examples are merely illustrative and the variations and complexities of a vast array of inventory and/or conditions can grow exponentially, driving an information management overload challenge, particularly in light of a rapidly changing environment.

In some embodiments, the inventory management control system 16 may receive population data which may include data from affiliates, other teams, and/or crowd source data for additional information in determining the out-on-shelf profile. For example, crowd sourced information may include comments and/or metrics indicating that items of inventory are not available in particular stores or geographic areas.

In the illustrative embodiment, the inventory management control system 16 determines a response register based on the out-on-shelf profile. The response register illustratively including actionable features for addressing the out-on-shelf profile. The response register is prioritized based on a prioritization schedule as discussed in additional detail herein.

The response register illustratively includes distinct register designations including store response register and supply chain response register. The store response register illustratively includes store level actionable features directed to address out-on-shelf status of a particular item of inventory, and requiring only store level action. Such store level action can include retrieving inventory from a local backroom or featured display (e.g., an row-end display) and restocking the inventory on the primary customer shelf, can include conditioning the primary customer shelf (e.g., rearranging inventory items which have been jumbled or moved out of place on the shelf), updating a perpetual inventory (e.g., inventory which is intended to never exhaust at the store level), create OS&D (overage, shortage, and damage) report (e.g., items not actually received at store despite supplier indicating otherwise), remove shelf item tag (e.g., pull shelf tag for discontinued items), and/or similar store-actionable features.

The supply chain response register illustratively includes supply chain level actionable features directed to address out-on-shelf status of a particular item of inventory, and requiring supply chain level action beyond the store level. Such supply chain level actionable features can include adjustments to a predetermined level of safety stock normally provisioned for supply to the store, adjustments to the purchase quantities for particular items, adjustments to the timing and/or manner of deliveries for particular items, and/or adjustments to type, style, quantity, size, of items in a packaging unit. In some embodiments, supply chain level actionable features can include vendor accountability features such as calling on vendor actions for shelf replenishment, conditioning, and/or enforcing contractual options such as generating credits.

Referring still to FIG. 1, the inventory management control system 16 may determine store level actionable features for inclusion on the store response register based on action criteria. Such action criteria illustratively includes exclusion criteria for sorting out actions which are less desirable for creating new store level action features. Such action criteria can include perpetual inventory (PI) quantity, order status, and exclusion status. For example, PI quantity can be applied as action criteria to exclude additional action when the PI quantity is less than one or is below a threshold safety stock level. In such instances, low PI quantity may trigger other actions (store level or otherwise) by other means which already address the instance, and additional store level action can be excluded.

By further example, order status can be applied as action criteria to exclude additional action when the order status indicates that relevant item delivery is pending, in-transit, versus received, and/or indicating that an item is to be deleted (temporarily or permanently), is unavailable temporarily, and/or is under buyer controls (order restrictions e.g., concerning seasonal items). By still further example, exclusion status can be applied as action criteria to exclude additional action when the exclusion status indicates that relevant items are designated high theft (e.g., under lock and key or technically always out-on-shelf), high impact (e.g., pandemic related outage), blacklisted, and/or under section reset (e.g., reworking of the area of the store creating allowable problem). These action criteria can each enhance the store response register by excluding actions which cannot be presently remedied at the store level and declutter the register from action features which cannot be resolved. Accordingly, the inventory management control system can provide a more tailored store response register. In some embodiments, such action criteria may include other criteria applied as action criteria such as Warehouse Quantity on Hand Status, Store/Item Discontinued Status, JDA Replenishment Status (Warehouse vs DSD), and Invoice Details. The inventory management control system 16 illustrative applies such action criteria to determine the store response register.

The inventory management control system 16 illustratively determines the prioritization schedule for the store level actionable features of the store response register. The prioritization schedule is illustratively defined as a dynamic prioritization applying a number of criteria for determining action feature priority. In the illustrative embodiment, dynamic prioritization criteria includes WIC status (e.g., WIC approved foods, baby food, diapers, critical basic need items), in-Ad status (advertisement), Key Value Item (items of predetermined strategic importance to the store or store brand), and/or market value (e.g., projected movement*gross margin. In the illustrative embodiment, such dynamic prioritization criteria may be applied in preference of their listed order above, but in some embodiments, may be applied in any suitable order.

In the illustrative embodiment, the inventory management control system 16 illustratively provides the store response register for notification to a user. In the illustrative embodiment, the inventory management control system 16 communicates the store response register for display on a user interface screen 26, embodied as a personal mobile device in FIG. 1. The inventory management control system 16 communicates the store response register to the user interface screen 26 having prioritization as discussed above such that the user as a store employee can attend to each store level actionable feature in order (rank ordered list). In some embodiments, the prioritization of store level actionable features may be indicated by presentation to the employee via ranked numbering, graphical emphasis (color, size, animation), and/or similarly suitable manner. Accordingly, the inventory management control system 16 can distill unmanageable quantities of inventory information into actionable items prioritized according to the needs of the store. Such technical solutions to the problems of large data employing data science techniques to refine and/or improve the user interface experience can be implemented according to the present disclosure.

The inventory management control system 16 can store some or all aspects of the out-on-shelf profile and/or response register within one more databases 28 for ongoing and/or future consideration. The inventory management control system 16 can communicate the response register to other terminals 30. For example, the inventory management control system 16 can communicate the supply chain response register to other terminals 30 of inventory ordering systems for executing supply chain level actions through various vendors. By further example, the inventory management control system 16 can communicate the response register to other terminals 30 as user terminals for quality assurance assessment by store employees.

Figure 2:
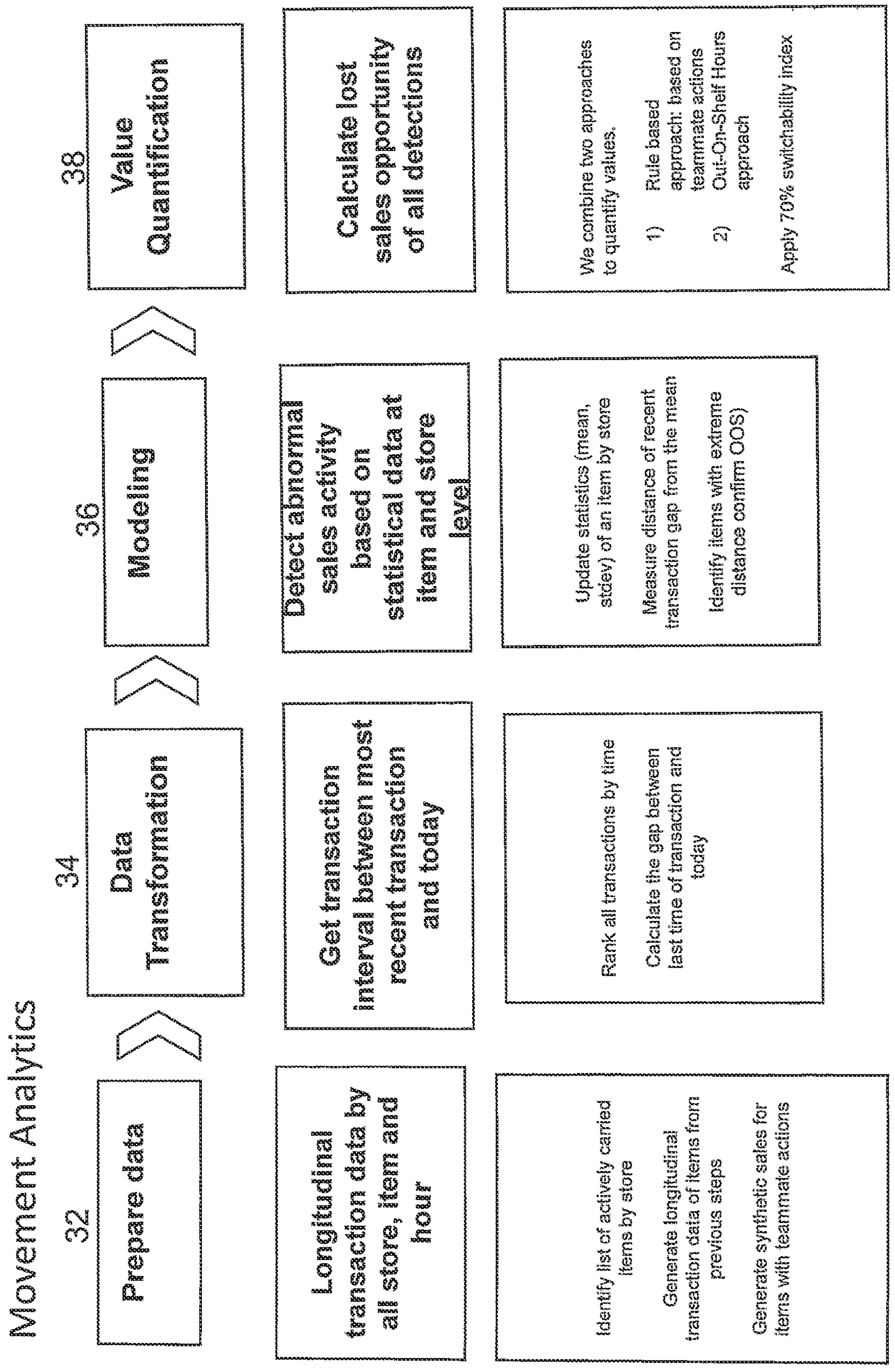
FIG. 2 is a flow diagram indicating analytical aspects applied by the consumer inventory management system according to aspects of the present disclosure.

Referring now to FIG. 2, a flow diagram is shown concerning certain analytics within the present disclosure. In the illustrative embodiment, such analytics are applied by the store database systems 26 to store level inventory operations data to provide store level inventory operations analytics for communication with the inventory management control system 16. In some embodiments, such analytics may be applied, partly or wholly, by the inventory management control system 16 in determining the out-on-shelf status.

In box 32, data for analytical consideration is prepared. Such data illustratively includes the store level inventory operations data such as longitudinal transactions data. Synthetics sales data can be generated based on available inventory information. In box 34, data transformation can be conducted. Transaction intervals can be applied to rank transactions according to time, and/or to calculate time gap between last transaction and present time. In box 36, modeling can be conducted. Abnormal sales activity can be determined based on item and store level data statistical analysis. Extreme time of gap-on-shelf status can be determined. In box 38, value quantification can be performed to calculate lost sales opportunity for gap-on-shelf status.

Figure 3:
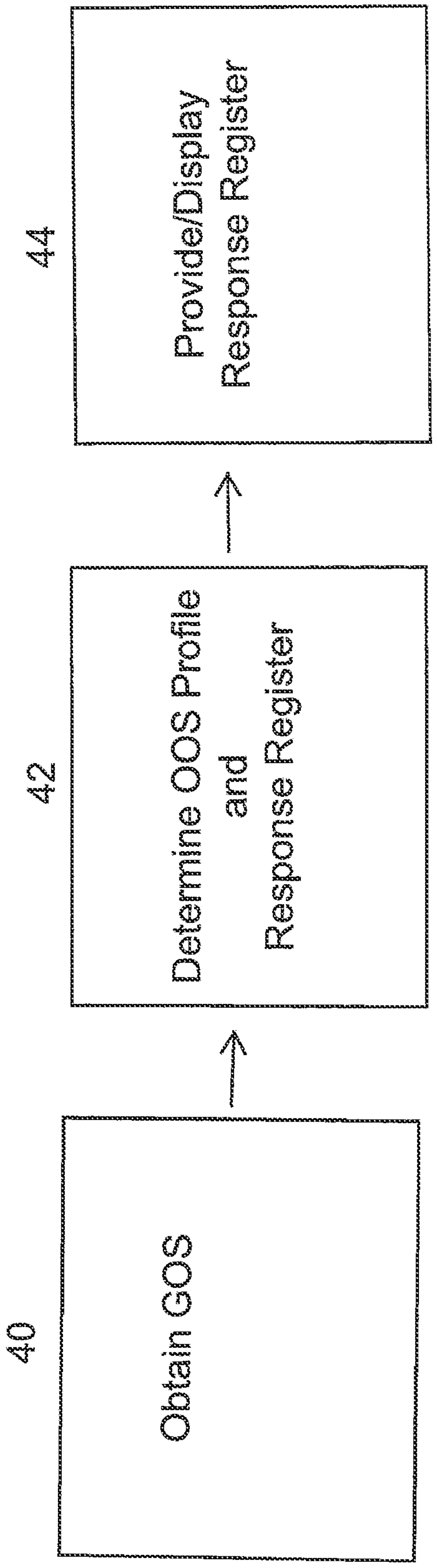
FIG. 3 is a flow diagram indicating operational aspects applied by the consumer inventory management system according to aspects of the present disclosure.

Referring now to FIG. 3, a flow diagram of the inventory management system is shown. In box 40, the inventory control system 16 illustratively obtains gap-on-shelf (GOS) status of inventory. This GOS is illustratively formed as a store level inventory operations analytical refinement of the gap-on-shelf determination by the visual image system 14. In some embodiments, the GOS status may be provided to the inventory management control system 16 by any suitable means, and/or may be determined by the inventory management control system 16 based on the store level inventory operations analytics and the gap-on-shelf determination of the visual image system 14. Upon obtaining the GOS status the flow diagram proceeds to box 42.

In box 42, the inventory management control system 16 illustratively determines the out-on-shelf profile (OOS). The OOS profile is illustratively determined based on the GOS status, and includes the tailored profile of product(s) out-on-shelf. The inventory management control system 16 illustratively determines the response register (e.g., the store level response register and/or supply chain response register) based on the OOS profile. Upon determining the response register the flow diagram proceeds to box 44.

In box 44, the inventory management control system 16 provides the response register for use. In the illustrative embodiment, the inventory management control system 16 communicates the response register to a user interface for display to the user. The response register, as determined by the inventory management control system 16 is displayed with prioritization of features for user operations. Accordingly, vast amounts of rapidly changing inventory data can be applied to provide a manageable user interface, avoiding and/or managing the challenges inherent to large data and/or inventory management of consumer inventories.

In the illustrative embodiment, the inventory management control system 16 can conduct system actions. Such system actions can be implemented in response to inactivity at the store level, for example, after a predetermined threshold of time. For example, once a store level actionable feature has been provided to the user, and a predetermined time of non-responsiveness occurs, the inventory management control system 16 may responsively communicate for system remedial action. Such system actions can include presuming and/or verifying whether items have returned to the shelf, such as by communicating to the visual image system 14 to inquire at the shelf location of interest, and/or by analyzing point-of-sale data to determine if relevant sales have occurred within a predetermined timeframe. Such presuming and/or verifying actions may be instituted periodically based on threshold quantity of time violations, for example, hourly to keep data accurate and/or timely. Such system actions can include supply chain actions such as generation of inventory orders, and/or setting perpetual inventory to zero to effect auto-ordering.

Figure 4:
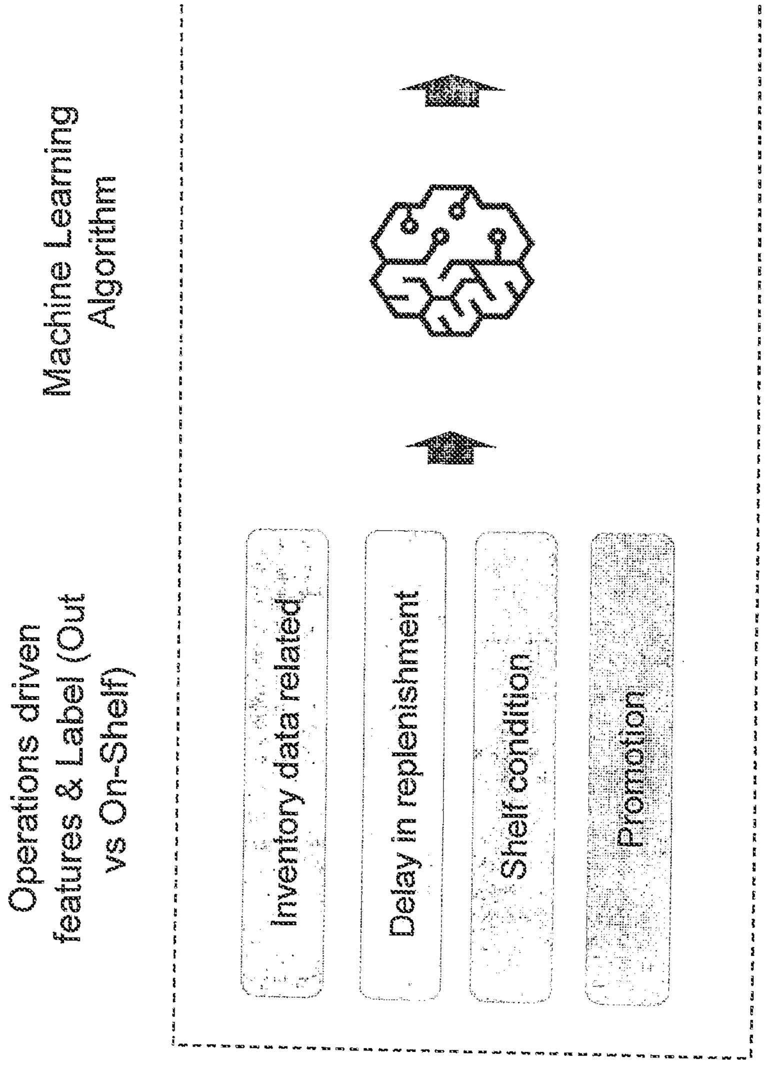
FIG. 4 is a diagrammatic view of a machine learning aspect of the present disclosure.

Referring now to FIG. 4, the inventory management control system 16 can include artificial intelligence for predicting OOS profiles. For example, as shown in FIG. 16, a machine learning algorithm may be applied to inventory data to determine the likelihood of OOS condition for individual items of inventory. Inventory data may include one or more of inventory quantities, time delays in restocking, shelf condition information, and/or promotional information. Such artificial intelligence can be applied at the individual store level, or for any number of stores as suggested in FIG. 4. Applying a threshold probability of OOS can determine whether to trigger related response register activity. Such predictive OOS operations can avoid unintended shortages, reduce delays in restocking, and/or improve the data burden for high activity periods. Within the present disclosure, the machine learning tools may be formed to include any suitable manner of model, for example but without limitation, supervised, quasi-supervised, and/or unsupervised learning models, such as linear regression, logistic regression, decision tree, SVM, Naive Bayes, kNN, k-means, random forest, dimensionality reduction algorithms, gradient boosting algorithms (e.g., GBM, XGBoost, LightGBM, CatBoost) style models.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure a rising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A consumer inventory system for managing inventory at the consumer level, the system comprising:

a visual image system comprising a camera system for capturing visual image data of consumer shelf inventory for determining gap-on-shelf status of inventory based on the visual image data; and an inventory management control system including at least one processor for executing instructions stored on memory to determine an out-on-shelf profile based on each of the gap-on-shelf status of inventory and a store inventory operations analysis including one or more of longitudinal transaction data and abnormality identification concerning inventory, the inventory management control system configured to determine a store response register based on each of the out-on-shelf profile and a remote supply chain profile including at least one of remote warehouse data and transportation data, wherein the remote warehouse data comprises timing and/or availability of inventory in remote warehouse supply, wherein the transportation data comprises timing and/or availability of inventory that is already in transit, wherein the store response register comprises store level actionable entries isolated from supply-chain level actionable; and a display screen arranged in communication with the inventory management control system to display the store response register for presentation to the user for prioritizing actionable features, wherein the store response register comprises a prioritization of items for imminent restocking at the store level.

2. The consumer inventory system of claim 1, wherein store level actionable entries include restocking activities actionable at the store level to replenish one or more inventory items out-on-shelf based on the out-on-shelf profile.

3. The consumer inventory system of claim 2, wherein store level actionable entries include restocking activities actionable at the store level including replenishing one or more inventory items out-on-shelf based on the out-on-shelf profile which inventory items are available within a local storage room, without the need for delivery of shipment to the store from remote warehousing.

4. The consumer inventory system of claim 1, wherein supply-chain level actionable entries include restocking activities requiring action at the supply-chain level to replenish one or more inventory items out-on-shelf based on the out-on-shelf profile.

5. The consumer inventory system of claim 3, wherein supply-chain level actionable entries include restocking activities requiring delivery of shipment to the store in order to fulfill replenishment of one or more inventory items out-on-shelf.

6. The consumer inventory system of claim 1, wherein market value quantification comprises quantification based on predetermined governing rules of assessment and based on out-on-shelf hours assessment.

7. The consumer inventory system of claim 1, wherein longitudinal transaction data includes transactional sale data based on one or more of identification of actively offered inventory, recorded transactional sales, and synthetic sales.

8. The consumer inventory system of claim 7, wherein synthetic sales are determined based on teammate actions.

9. The consumer inventory system of claim 1, wherein the abnormality identification is determined based on ranking of transactions according to time and a time gap since a last transaction concerning an inventory item.

10. The consumer inventory system of claim 9, wherein the abnormality identification includes determination of extreme out-on-shelf time status for an inventory item.

11. The consumer inventory system of claim 1, wherein the out-on-shelf profile includes a determination of items for sale unstocked on consumer inventory shelves based on the gap-on-shelf status and the inventory movement analysis.

12. The consumer inventory system of claim 11, wherein the determination of items for sale unstocked on consumer inventory shelves includes a prediction of consumer inventory items which exist on consumer inventory shelves with high likelihood of being unstocked on shelves within a threshold time period.

13. A method of consumer inventory management, the method comprising:

capturing visual image data of consumer shelf inventory via a camera system of a visual image system and determining a gap-on-shelf status of inventory based on the visual image data, determining an out-on-shelf profile based on each of the gap-on-shelf status and a store inventory operations analysis including one or more of longitudinal transaction data and abnormality identification concerning inventory, via an inventory management control system, and determining a store response register based on each of the out-on-shelf profile and a remote supply chain profile including at least one of remote warehouse data and transportation data, wherein the remote warehouse data comprises timing and/or availability of inventory in remote warehouse supply, wherein the transportation data comprises timing and/or availability of inventory that is already in transit, wherein the store response register comprises store level actionable entries isolated from supply-chain level actionable entries, and presenting at least a portion of the response register including a prioritization of items for imminent restocking at the store level to a user, via a display screen, for prioritizing actionable features.

14. The method of claim 13, wherein the store response register is determined based on a store level profile including at least one of availability from featured display, availability from backroom, perpetual inventory quantity, and/or shelf condition.

15. The consumer inventory system of claim 1, wherein the display screen is arranged in communication with the inventory management control system to display the store response register for presentation to the user for prioritizing actionable features for presentation of at least a portion of the response register with ranking of the items for imminent restocking.

16. The method of claim 13, wherein presenting at least a portion of the response register includes the prioritization of items for imminent restocking at the store level with ranking of the items for imminent restocking.

* * * * *